United States Patent
Wang et al.

(10) Patent No.: US 8,805,437 B2
(45) Date of Patent: Aug. 12, 2014

(54) DUAL-MODE MOBILE DEVICE AND METHOD FOR ENHANCING MUTUAL INTERFERENCE SENSITIVITY OF THE DUAL-MODE MOBILE DEVICE

(75) Inventors: Xiao-Dong Wang, Shenzhen (CN); Jian Sha, Shenzhen (CN); Ning-Feng Zang, Shenzhen (CN); Hang Dong, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 330 days.

(21) Appl. No.: 13/407,689

(22) Filed: Feb. 28, 2012

(65) Prior Publication Data

US 2012/0329451 A1 Dec. 27, 2012

(30) Foreign Application Priority Data

Jun. 21, 2011 (CN) .......................... 2011 1 0167363

(51) Int. Cl.
*H04M 1/00* (2006.01)
*H04J 3/16* (2006.01)
(52) U.S. Cl.
USPC ...................... 455/553.1; 455/552.1; 370/466

(58) Field of Classification Search
CPC ...................................................... H04W 88/06
USPC ........................................................ 455/553.1
See application file for complete search history.

(56) References Cited

U.S. PATENT DOCUMENTS 7,672,290 B2 * 3/2010 Park .............................. 370/350
8,498,574 B2 * 7/2013 Beninghaus et al. ........ 455/63.1

* cited by examiner

*Primary Examiner* — Huy C Ho
(74) *Attorney, Agent, or Firm* — Novak Druce Connolly Bove + Quigg LLP

(57) ABSTRACT

A dual-mode mobile device comprises two mode systems. If both of two mode systems of the dual-mode mobile device are in a working status, the mobile device uses a first mode system to control a first power amplifier of the first mode system to transmit power signals, informs a second mode system that the first power amplifier is transmitting power signals, and controls the second mode system to enter into a mixed mode. If the second mode system is in a working status and the first mode system is in a required to work status, the mobile device uses the first mode system to inform the second mode system enter into the mixed mode, and controls the first mode system to inform a second power amplifier of the second mode system to transmit power signals causing both of the first and second mode systems to work synchronously.

20 Claims, 6 Drawing Sheets

DUAL-MODE MOBILE DEVICE AND METHOD FOR ENHANCING MUTUAL INTERFERENCE SENSITIVITY OF THE DUAL-MODE MOBILE DEVICE

BACKGROUND

1. Technical Field

Embodiments of the present disclosure generally relate to management of dual-mode mobile devices, and particularly to a dual-mode mobile device and a method for enhancing mutual interference sensitivity of the dual-mode mobile device.

2. Description of Related Art Dual-mode mobile devices, which may include a Global System for Mobile Communication (GSM) system and a Code Division Multiple Access (CDMA) system, are commonly used nowadays. However, when the GSM system transmits high power signals, an aerial of the CDMA system may receive the high power signals, reducing the performances of the CDMA system.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device.

Figure 1:
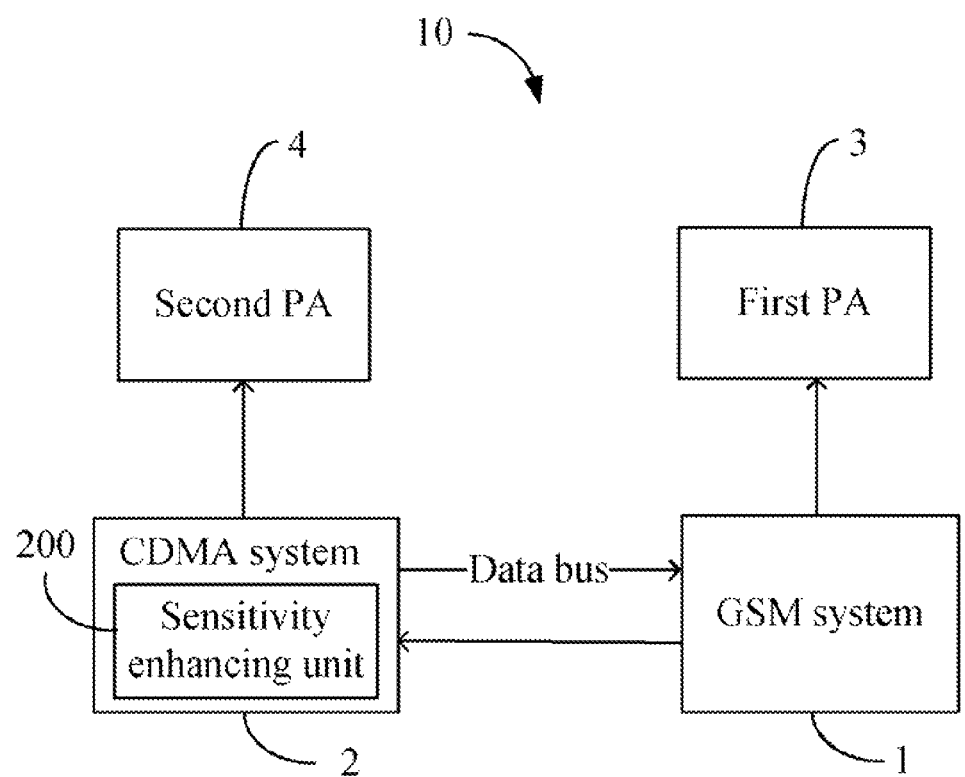
FIG. 1 is a schematic diagram of one embodiment of a dual-mode mobile device including a sensitivity enhancing unit.

FIG. 1 is a schematic diagram of one embodiment of a dual-mode mobile device 10 including a sensitivity enhancing unit 200. The dual-mode mobile device 10 may include a first mode system 1, and a second mode system 2. The first mode system 1 communicates with the second mode system 2 via a data bus of the dual-mode mobile device 10. The sensitivity enhancing unit 200 enhances sensitivity of the dual-mode mobile device 10 under mutual interference of the first mode system 1 and the second mode system 2.

In one embodiment, the first mode system 1 is a Global System for Mobile Communication (GSM) system (hereinafter "GSM system 1"), and the second mode system 2 is a Code Division Multiple Access (CDMA) system (hereinafter "CDMA system 2"). The sensitivity enhancing unit 200 may include one or more computerized instructions that are stored in a storage system of the second mode system 2, and executed by a processor of the second mode system 2. The detailed functions of the sensitivity enhancing unit 200 are described, in reference to FIG. 2 to FIG. 6 below.

In the embodiment, the dual-mode mobile 10 further includes a first power amplifier 3 (hereinafter "first PA 3") connected to the first mode system 1, and a second power amplifier 4 (hereinafter "second PA 4") connected to the second mode system 2.

In the embodiment, the sensitivity enhancing unit 200 can determine a status of the GSM system 1 and the CDMA system 2. In one embodiment, each of the GSM system 1 and the CDMA system 2 has two work statuses, such as a working status and a required to work status. "Working status" means that the GSM system 1 and the CDMA system 2 are operational, and are capable of receiving or transmitting signals. "Required to work status" means that the GSM system 1 or the CDMA system 2 is in a non-operational or a non-usable status, and a user wants to use one or two of the GSM system 1 and the CDMA system 2, to receive or transmit signals.

Figure 2:
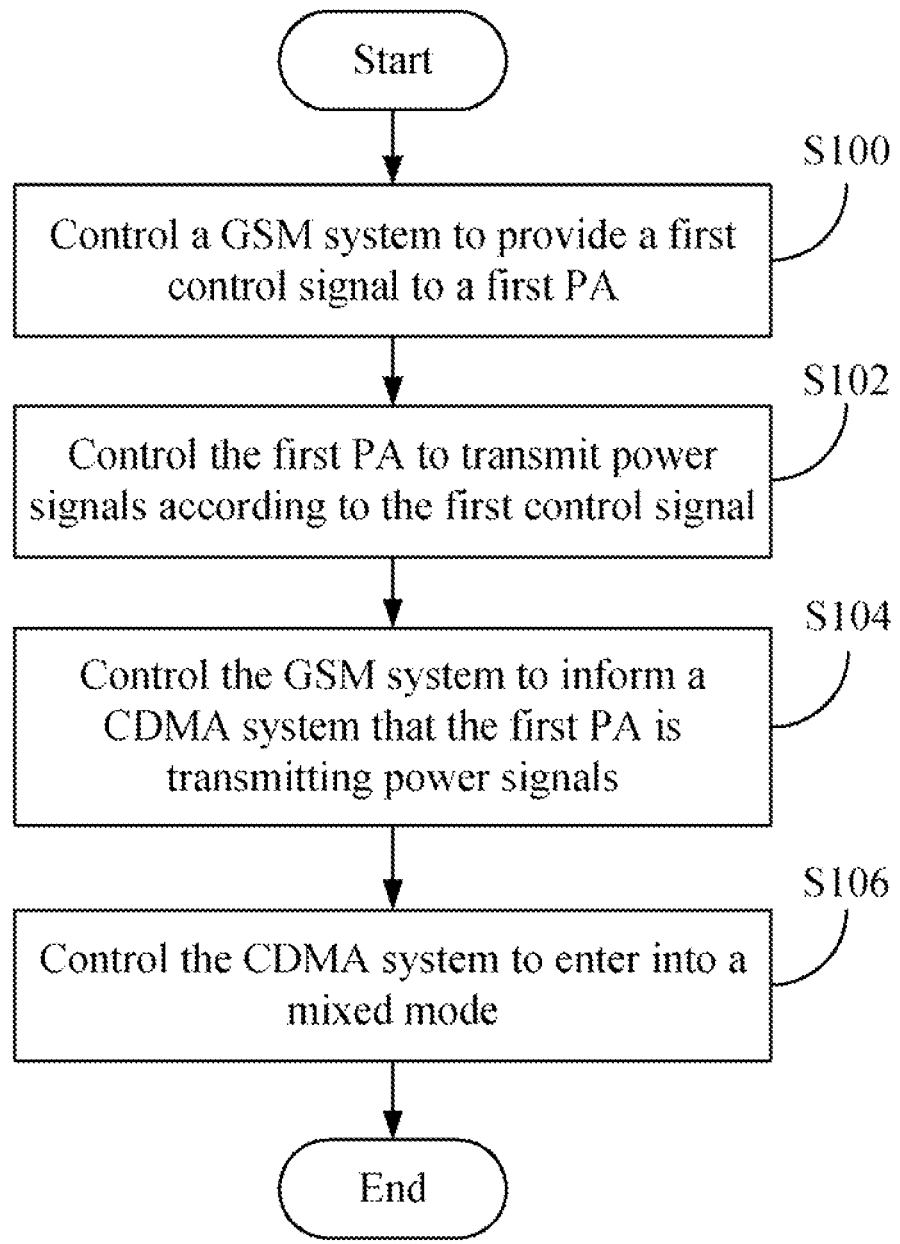
FIG. 2 is a flowchart illustrating one embodiment of a method for enhancing mutual interference sensitivity of the dual-mode mobile device of FIG. 1 upon the condition that the first mode system and the second mode system are working.

FIG. 2 is a flowchart illustrating one embodiment of a method for enhancing mutual interference sensitivity of the dual-mode mobile 10 of FIG. 1 upon the condition that the GSM system 1 and the CDMA system 2 are in the working status. In the embodiment, Depending on the embodiment, in FIG. 2, additional steps may be added, others removed, and the ordering of the steps may be changed.

Figure 3:
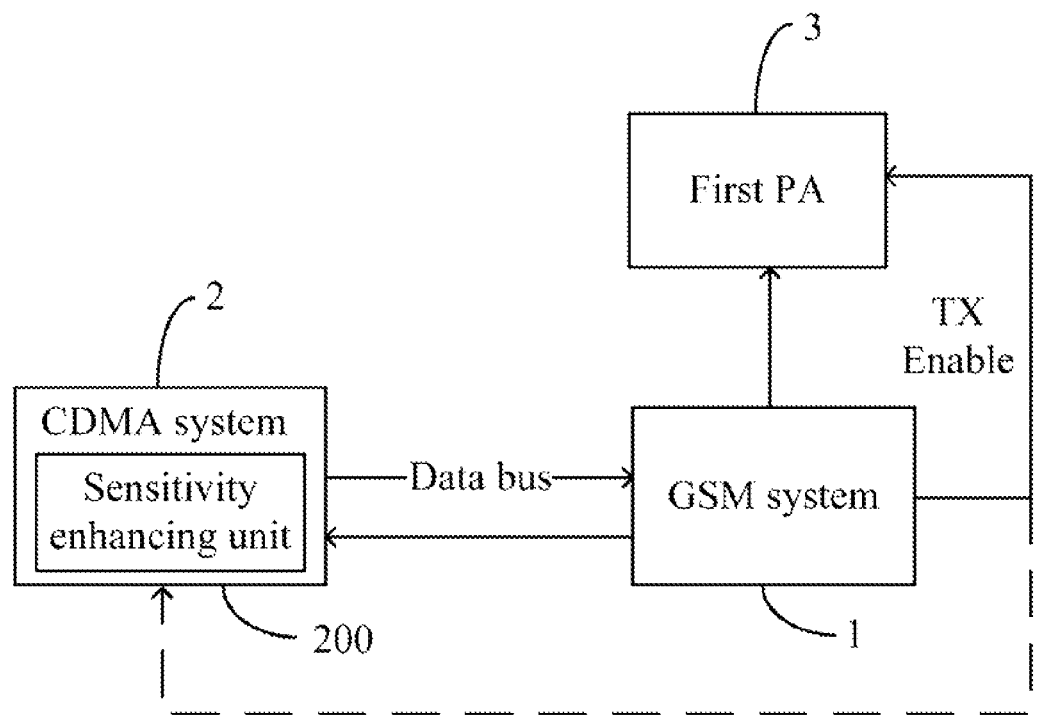
FIG. 3 illustrates an example of both of a first mode system and a second mode system of the dual-mode mobile device are working.

In step S100, the sensitivity enhancing unit 200 controls the GSM system 1 to provide a first control signal to the first PA 3. The first control signal is a transmitter (hereinafter "TX") Enable signal as shown in FIG. 3.

In step S102, the sensitivity enhancing unit 200 controls the first PA 3 to transmit power signals according to the first control signal. In the embodiment, the power signals may be transmitted to an antenna (not shown in Figures), and the antenna broadcasts the power signals to a base station (not shown in Figures).

In step S104, the sensitivity enhancing unit 200 controls the GSM system 1 to inform the CDMA system 2 that the first PA 3 is transmitting power signals. For example, the GSM system 1 can send information about the power transmission of the first PA 3 to the CDMA system 2. In the embodiment, the GSM system 1 is connected to the CDMA system 2 via a designated transmission line, such as a TX Enable line.

In order to avoid interference with the first PA 3 transmits the power signals, in step S106, the sensitivity enhancing unit 200 controls the CDMA system 2 to enter into the mixed mode. The mixed mode allows both of the GSM system 1 and the CDMA system 2 work synchronously. In other words, in the mixed mode, a user can use the dual-mode mobile device 10 to make a telephone call and to get on the Internet, or the user can use the mobile device 10 to get on the Internet while using the mobile device 10 to make a telephone call.

Figure 4:
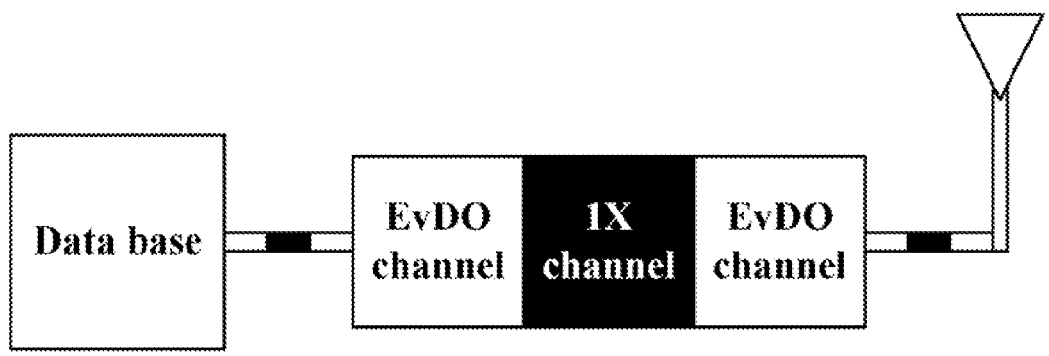
FIG. 4 is a schematic diagram illustrating a mixed mode.

As shown in FIG. 4, the mixed mode supports voice and digital signals, and separates the voice and digital signals into two parts. For example, since the GSM system 1 is a time division multiple access system, a frame sent by the GSM system 1 has eight time slots. In one embodiment, one of the eight time slots is used for emitting signals during a voice communication. In another embodiment, if the GSM system 1 works under a general packet radio service (GPRS) mode or an enhanced data rate for GSM evolution (EDGE) mode, two or three time slots are used for emitting signals during the voice communication. In the mixed mode, the CDMA system 2 supports the voice communication and the digital communication, "IX" is the speech pattern, and "EvDO" is the digital pattern. In order to make a telephone call and get on the Internet synchronously, the mixed mode separates the speech pattern and the digital pattern into two parts.

Figure 5:
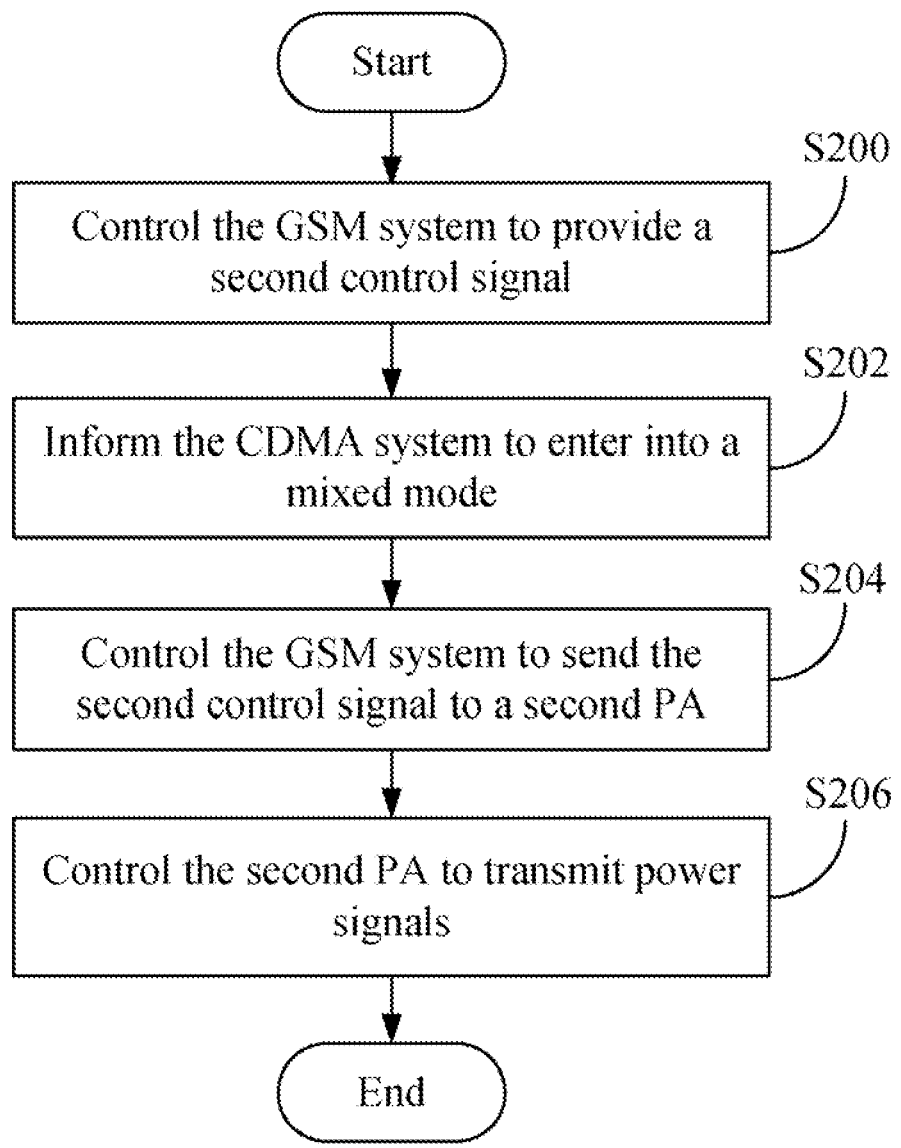
FIG. 5 is a flowchart illustrating one embodiment of a method for enhancing mutual interference sensitivity of the dual-mode mobile device of FIG. 1 upon the condition that the first mode system is working and the second mode system is required to work.

FIG. 5 is a flowchart illustrating one embodiment of a method for enhancing mutual interference sensitivity of the dual-mode mobile of FIG. 1 upon the condition that the first mode system 1 is in the working status and the second mode system 2 is in a required to work status. Depending on the embodiment, in FIG. 5, additional steps may be added, others removed, and the ordering of the steps may be changed.

Figure 6:
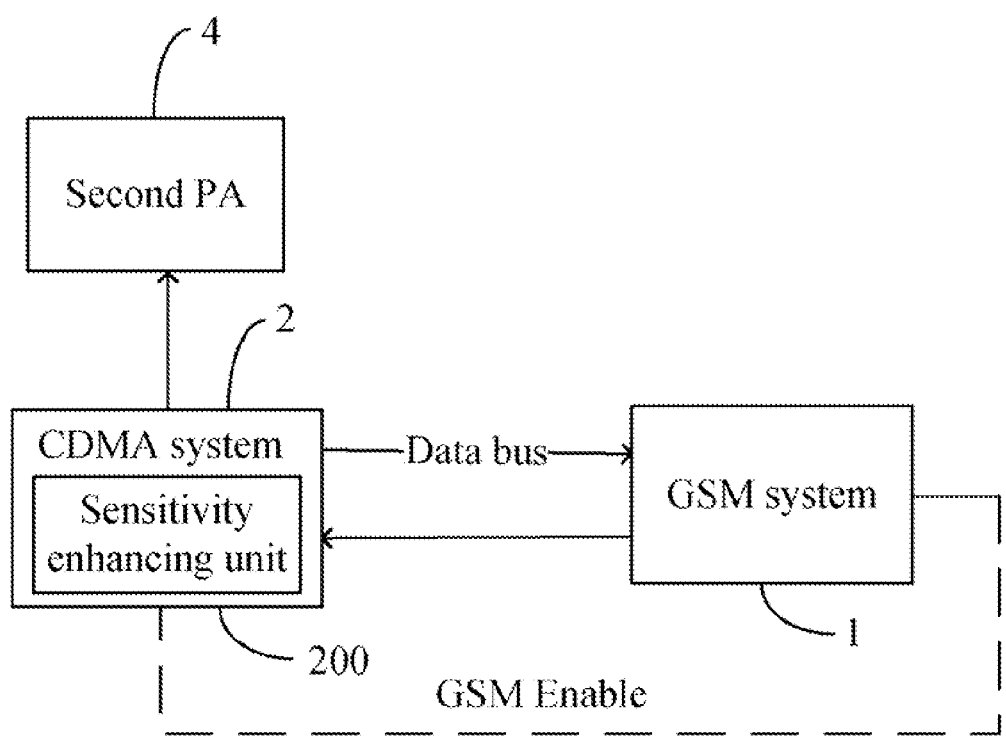
FIG. 6 illustrates an example of a first mode system is working and a second mode system is required to work.

In block S200, the sensitivity enhancing unit 200 controls the GSM system 1 to provide a second control signal. In FIG. 6, "GSM Enable signal" may be the second control signal.

In block S202, the sensitivity enhancing unit 200 controls the GSM system 1 to inform the CDMA system 2 to enter into the mixed mode as shown in FIG. 4.

In block S204, the sensitivity enhancing unit 200 controls the GSM system 1 to send the second control signal to the PA 4.

In block S206, the sensitivity enhancing unit 200 controls the second PA 4 to transmit power signals and both of the GSM system 1 and the CDMA system 2 can work synchronously. As following the method, the CDMA system 2 and the GSM system 1 will not interfere with each other.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method of a mobile device comprising a first mode system and a second mode system, the method comprising:
   determining a status of the first and second mode systems;
   upon the determination that both of the first and second mode systems are in a working status, using the first mode system to control a first power amplifier of the first mode system to transmit power signals to an antenna for broadcasting the power signals to a base station, informing the second mode system that the first power amplifier is transmitting the power signals, and controlling the second mode system to enter into a mixed mode, wherein the mixed mode allows both of the first and second mode systems to work synchronously; and
   upon the determination that the second mode system is in a working status and the first mode system is in a required to work status, using the first mode system to inform the second mode system to enter into the mixed mode, controlling the first mode system to inform a second power amplifier of the second mode system to transmit power signals to the antenna, and enabling both of the first and second mode systems to work synchronously according to the mixed mode.

2. The method as claimed in claim 1, wherein the first mode system is a Global System for Mobile Communication system, and the second mode system is a Code Division Multiple Access system.

3. The method as claimed in claim 1, wherein the first mode system communicates with the second mode system via a data bus of the mobile device.

4. The method as claimed in claim 1, wherein the first mode system transmits the first control signal and the second control signal to the second mode system via a designated transmission line.

5. The method as claimed in claim 1, wherein the mixed mode supports voice and digital signals, and separates the voice and the digital signals into two parts.

6. The method as claimed in claim 1, wherein the first and second mode systems are operational and are capable of receiving or transmitting signals in the working status.

7. The method as claimed in claim 1, wherein either the first mode system or the second mode system is in a non-operational or a non-usable status in the required to work status.

8. A mobile device, comprising:
   at least one processor;
   a storage system;
   a first mode system and a second mode system; and
   one or more modules that are stored in the storage system and executed by the at least one processor, the one or more modules comprising:
   a determination module that determine a status of the first and second mode systems;
   a first control module that uses the first mode system to control a first power amplifier of the first mode system to transmit power signals to an antenna for broadcasting the power signals to a base station, informs the second mode system that the first power amplifier is transmitting the power signals, and controls the second mode system to enter into a mixed mode, wherein the mixed mode allows both of the first and second mode systems to work synchronously, upon the determination that both of the first and second mode systems are in a working status; and
   a second control module that uses the first mode system to inform the second mode system to enter into the mixed mode, controls the first mode system to inform a second power amplifier of the second mode system to transmit power signals to the antenna, and enables both of the first and second mode systems to work synchronously according to the mixed mode, upon the determination that the second mode system is in a working status and the first mode system is in a required to work status.

9. The mobile device as claimed in claim 8, wherein the first mode system is a Global System for Mobile Communication system, and the second mode system is a Code Division Multiple Access system.

10. The mobile device as claimed in claim 8, wherein the first mode system is communicated with the second mode system via a data bus.

11. The mobile device as claimed in claim 8, wherein the first mode system transmits the first control signal and the second control signal to the second mode system via a designated transmission line.

12. The mobile device as claimed in claim 8, wherein the mixed mode supports voice and digital signals, and separates the voice and the digital signals into two parts.

13. The mobile device as claimed in claim 8, wherein the first and second mode systems are operational and are capable of receiving or transmitting signals in the working status.

14. The mobile device as claimed in claim 8, wherein either the first mode system or the second mode system is in a non-operational or a non-usable status in the required to work status.

15. A non-transitory storage medium having stored thereon instructions that, when executed by a processor of a mobile device comprising two mode systems, causes the mobile device to:

determine a status of the first and second mode systems;

upon the determination that both of the first and second mode systems are in a working status, use the first mode system to control a first power amplifier of the first mode system to transmit power signals to an antenna for broadcasting the power signals to a base station, inform the second mode system that the first power amplifier is transmitting the power signals, and control the second mode system to enter into a mixed mode, wherein the mixed mode allows both of the first and second mode systems to work synchronously; and upon the determination that the second mode system is in a working status and the first mode system is in a required to work status, use the first mode system to inform the second mode system to enter into the mixed mode, control the first mode system to inform a second power amplifier of the second mode system to transmit power signals to the antenna, and enable both of the first and second mode systems to work synchronously according to the mixed mode.

16. The non-transitory storage medium as claimed in claim 15, wherein the first mode system is a Global System for Mobile Communication system, and the second mode system is a Code Division Multiple Access system.

17. The non-transitory storage medium as claimed in claim 15, wherein the first mode system transmits the first control signal and the second control signal to the second mode system via a designated transmission line.

18. The non-transitory storage medium as claimed in claim 15, wherein the mixed mode supports voice and digital signals, and separates the voice and the digital signals into two parts.

19. The non-transitory storage medium as claimed in claim 15, wherein the first and second mode systems are operational and are capable of receiving or transmitting signals in the working status.

20. The non-transitory storage medium as claimed in claim 15, wherein either the first mode system or the second mode system is in a non-operational or a non-usable status in the required to work status.

* * * * *